Jan. 12, 1960  D. ENGELSMANN  2,920,542
POINTER CONTROL STRUCTURE FOR CAMERAS HAVING EXPOSURE METERS
Filed April 9, 1958
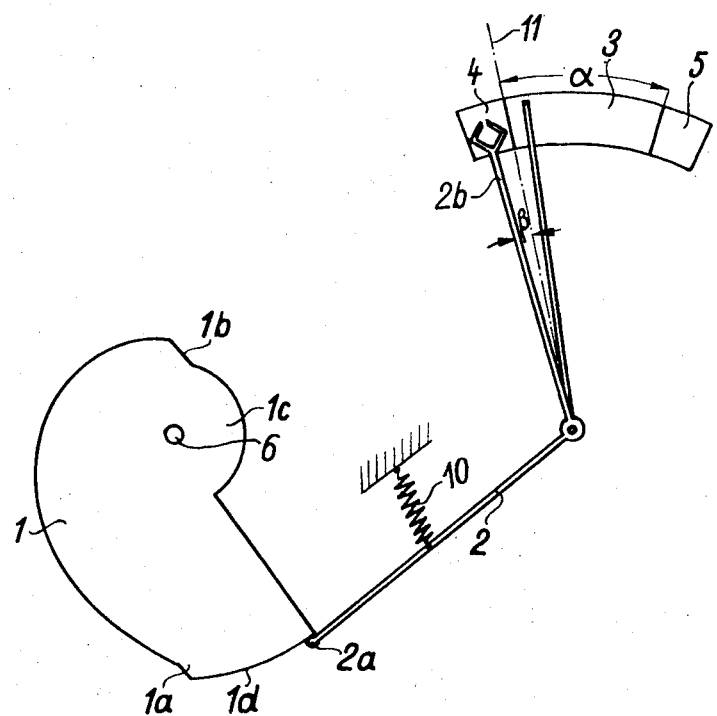
INVENTOR.
DIETER ENGELSMANN
BY
Michael S. Striker
Attorney

United States Patent Office 2,920,542
Patented Jan. 12, 1960

---

2,920,542

POINTER CONTROL STRUCTURE FOR CAMERAS HAVING EXPOSURE METERS

Dieter Engelsmann, Munich, Germany, assignor to Agfa Aktiengesellschaft, Leverkusen, Germany Application April 9, 1958, Serial No. 727,463

Claims priority, application Germany April 20, 1957

7 Claims. (Cl. 95—10)

The present invention relates to photographic cameras.

More particularly, the present invention relates to cameras which have exposer meters incorporated into the cameras.

With cameras of this type when the shutter is set by adjusting the exposure time and/or the aperture a conventional totalizing drive cooperates with a pointer of the exposure meter to automatically turn this pointer to values corresponding to the light values for which the shutter is set, these light values corresponding to a combination of the exposure time and aperture opening at which the shutter is set. Such a pointer is moved with this structure until it becomes aligned with a pointer of the exposure meter which is moved by the galvanometer thereof, so that when the two pointers are aligned the operator knows that the shutter is properly set.

With some cameras the scale of the exposure meter has light values extending through a given range while the setting of the shutter is capable of turning the pointer controlled by the totalizing drive beyond the ends of this range, and with such an arrangement the operator does not know, when the shutter controlled pointer is at the ends of the range, whether or not the shutter has been adjusted to a position located beyond the range of light values of the exposure meter.

One of the objects of the present invention is to overcome this drawback by providing, in a camera whose shutter mechanism is capable of moving the shutter controlled pointer beyond the range of graduations on the light scale of the exposure meter, a structure which very positively and clearly moves this pointer suddenly and through a substantial distance beyond the ends of the range of the scale of the exposure meter so that the pointer appears to have a springy movement beyond the ends of the range of graduations of the exposure meter and the operator knows without any doubt that the shutter has been set at values beyond the range of the exposure meter.

It is also an object of the present invention to provide an exceedingly simple structure for accomplishing the above results.

With the above objects in view the present invention includes in a camera which has an exposure meter, an exposure meter scale having a series of graduations extending through a predetermined range and a shutter controlled pointer which is movable along this scale. A means cooperates with the pointer to move this pointer along the scale, and this means acts on the pointer when it is in the region of the ends of the range of the scale to suddenly move the pointer through a substantial distance beyond the ends of the range of the scale when the shutter is set at values beyond those of the scale so that the operator clearly perceives that the shutter is set at light values outside of the range of the meter.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawing.

Referring now to the drawing, there is shown therein a cam 1 which forms part of the totalizing drive of the shutter mechanism of the camera. In a manner well known in the art setting of the aperture and of the exposure time corresponds to a certain light value which causes the cam 1 to be turned with pin 6 about the axis of the latter to a perdetermined angular position. This cam 1 has a camming surface which cooperates with a pointer 2 which has the form of a bell crank in the illustrated example and which is turnable about an axis parallel to that of the pivot 6. The end 2a of the pointer 2 is at all times in engagement with the camming surface of the cam 1 by any suitable means such as the spring 10 diagrammatically shown in the drawing. The end 2b of the pointer 2 moves along the scale 3 of the exposure meter. In the illustrated example, this scale 3 has a series of graduations indicating light values and extending through the range α indicated in the drawing. Assuming, for example, that the shutter is capable of being set at light values in a range of 2–18 while the exposure meter can only indicate values in a range of 3–16, it is apparent that the shutter may be set at values which would locate the pointer beyond the range of the scale 3, and at these extremely small values at the ends of the range the operator would not know whether a true light value is being indicated or the shutter has been set beyond the range of the scale 3. Thus, when the pointer is at the angular position indicated by line 11 at the end of the scale 3, there is uncertainty as to the shutter setting.

At this time the operator does not know whether or not the shutter has been set at light values beyond the range of the scale of the exposure meter.

In order to avoid this undesirable result the cam 1 is provided in accordance with the present invention with a camming portion of predetermined length and curvature corresponding to the range α of the scale 3. At the end of this camming portion of predetermined curvature and length, which corresponds to the lowest end of the scale 3, the cam 1 is provided with a camming portion 1a and at the other end of the camming portion of predetermined length and curvature which corresponds to the scale 3, this other end corresponding to the highest end of the scale 3, the cam 1 is provided with an additional camming portion 1b. These camming portions 1a and 1b are of sharply different curvature from the elongated camming portion between portions 1a and 1b, and the curvature of portions 1a and 1b is such that when the cam has been turned beyond the predetermined range corresponding to the range of the scale 3 the pointer 2 moves suddenly, as if by spring action, through a substantial, easily noticeable distance beyond one or the other ends of the scale into the areas 4 or 5 respectively located beyond the ends of the scale range α. At this time the pointer 2 moves suddenly through an angular distance β, as indicated in the drawing for the lower end of the scale.

In order to maintain the pointer either at the area 4 or at the area 5 during continued turning of the cam, the cam is provided with a pair of further camming portions 1c and 1d respectively located next to and beyond the camming portions 1b and 1a and each having the curvature of an arc of a circle whose center is located in the axis of the pivot 6 of the cam 1. Thus, when the end 2a of the pointer engages either the camming portion 1d or the camming portion 1c the pointer will remain stationary while the cam 1 continues to turn.

It will be understood that each of the elements described above, or two or more together, may also find a useful application in other types of cameras, differing from the types described above.

While the invention has been illustrated and described as embodied in a camera with exposure meters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

What is claimed as new and desired to be secured by Letters Patent is:

1. In a camera having an exposure meter, in combination, a scale forming part of the exposure meter and having graduations extending through a predetermined range; a pointer movable along said scale; and means operable upon setting of the shutter of the camera and cooperating with said pointer for automatically moving said pointer along said scale, said means suddenly moving the pointer through a substantial distance beyond one or the other of the ends of said range when the shutter is set at values located outside of said range.

2. In a camera having an exposure meter, in combination, a scale forming part of the exposure meter and having graduations extending through a predetermined range; a pointer movable along said scale; and a cam turnable to different angular positions upon setting of the shutter, said cam having a camming surface cooperating with said pointer for automatically moving the same along said scale, said camming surface having a predetermined curvature along one portion of the camming surface, and the length of said portion of said camming surface corresponding to the length of said range of said scale so that when the ends of said portion of said camming surface engage the pointer the latter will be respectively located at the ends of said range, said camming surface having at the ends of said portion of said camming surface a pair of additional camming surfaces of sharply different curvature from said portion of said camming surface for suddenly moving said pointer beyond the ends of said range, respectively.

3. In a camera having an exposure meter, in combination, a scale forming part of the exposure meter and having graduations extending through a predetermined range; a pointer movable along said scale; and a cam turnable to different angular positions upon setting of the shutter, said cam having a camming surface cooperating with said pointer for automatically moving the same along said scale, said camming surface having a predetermined curvature along one portion of the camming surface, and the length of said portion of said camming surface corresponding to the length of said range of said scale so that when the ends of said portion of said camming surface engage the pointer the latter will be respectively located at the ends of said range, said camming surface having at the ends of said portion of said camming surface a pair of additional camming surfaces of sharply different curvature from said portion of said camming surface for suddenly moving said pointer beyond the ends of said range, respectively, and said cam having a pair of circular camming surfaces respectively located next to and beyond said pair of additional camming surfaces and each having its center of curvature located in the turning axis of the cam so that the pointer remains stationary with respect to the scale during the time that the pointer cooperates with either of said circular camming surfaces.

4. In a camera having an exposure meter, in combination, a scale forming part of the exposure meter and having graduations extending through a predetermined range; a pointer movable along said scale; and means operable upon setting of the shutter of the camera and cooperating with said pointer for automatically moving said pointer along said scale, said means moving said pointer from one to the other end of said scale through a distance having a predetermined ratio to the distance through which said means moves, and said means being movable through a relatively short additional distance for moving said pointer beyond at least one end of said scale through a distance having a ratio to said additional distance which is several times greater than said predetermined ratio.

5. In a camera having an exposure meter, in combination, a scale forming part of the exposure meter and having graduations extending through a predetermined range; a pointer movable along said scale; and means operable upon setting of the shutter of the camera and cooperating with said pointer for automatically moving said pointer along said scale, said means suddenly moving the pointer through a substantial distance beyond at least one end of said range when the shutter is set at values located outside said range.

6. In a camera having an exposure meter, in combination, a scale forming part of the exposure meter and having graduations extending through a predetermined range; a pointer movable along said scale; and a cam turnable to different angular positions upon setting of the shutter, said cam having a camming surface cooperating with said pointer for automatically moving the same along said scale, said camming surface having a predetermined curvature along one portion of the camming surface, and the length of said portion of said camming surface corresponding to the length of said range of said scale so that when the ends of said portion of said camming surface engage the pointer the latter will be respectively located at the ends of said range, said camming surface having at one end of said portion of said camming surface an additional camming surface of sharply different curvature from said portion of said camming surface for moving said pointer through a substantial distance beyond one end of said range upon turning of said cam through a slight angle with said additional camming surface in engagement with said pointer.

7. In a camera having an exposure meter, in combination, a scale forming part of the exposure meter and having graduations extending through a predetermined range; a pointer movable along said scale; and a cam turnable to different angular positions upon setting of the shutter, said cam having a camming surface cooperating with said pointer for automatically moving the same along said scale, said camming surface having a predetermined curvature along one portion of the camming surface, and the length of said portion of said camming surface corresponding to the length of said range of said scale so that when the ends of said portion of said camming surface engage the pointer the latter will be respectively loctaed at the ends of said range, said camming surface having at one end of said portion of said camming surface an additional camming surface of sharply different curvature from said portion of said camming surface for moving said pointer through a substantial distance beyond one end of said range upon turning of said cam through a slight angle with said additional camming surface in engagement with said pointer, and said cam having at the end of said additional camming surface distant from said portion of said camming surface a circular camming surface whose center of curvature is in the turning axis of the cam so that the pointer will not move along said scale when engaged by said circular camming surface.

References Cited in the file of this patent

UNITED STATES PATENTS

| | | |
|---|---|---|
| 2,341,393 | Simmon | Feb. 8, 1944 |
| 2,343,690 | Mihalyi | Mar. 7, 1944 |
| 2,358,083 | Mihalyi | Sept. 12, 1944 |